Figure 1:
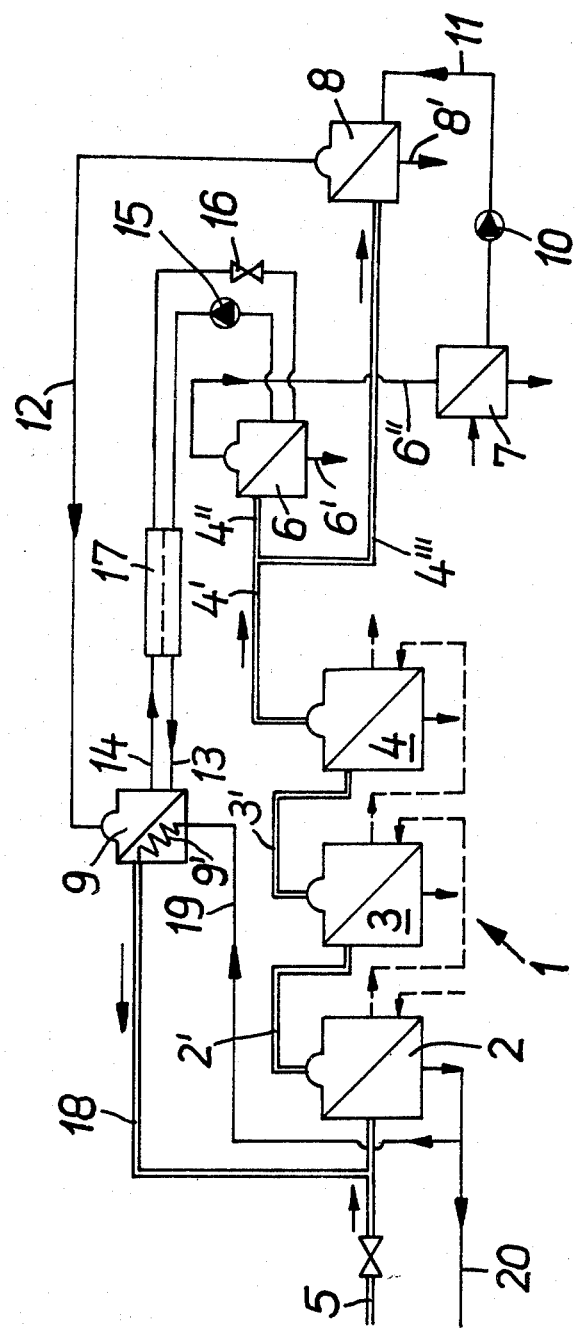

United States Patent [19]

Franzen

[11] 4,403,480
[45] Sep. 13, 1983

[54] METHOD OF AND APPARATUS FOR RECOVERING HEAT ENERGY CONTAINED IN VAPORS OF MULTI-STAGE EVAPORATORS INSTALLED FOR THERMAL MATERIAL-SEPARATING PROCESSES

[75] Inventor: Paul Franzen, Koblenz, Fed. Rep. of Germany

[73] Assignee: Maschinenfabrik Buckau R. Wolf AG, Grevenbroich, Fed. Rep. of Germany

[21] Appl. No.: 231,018

[22] Filed: Feb. 3, 1981

[30] Foreign Application Priority Data

Feb. 6, 1980 [DE] Fed. Rep. of Germany ....... 3004197

[51] Int. Cl.³ .............................................. F25B 7/00
[52] U.S. Cl. ......................................... 62/79; 62/476; 62/238.6
[58] Field of Search ................ 62/79, 101, 148, 238.3, 62/476; 165/1

[56] References Cited

U.S. PATENT DOCUMENTS

| 4,207,751 | 6/1980 | Kampfenkel et al. ............. 62/238.3 |
| 4,314,668 | 2/1982 | Jansen et al. ........................... 62/483 |
| 4,337,625 | 7/1982 | Wilkinson ....................... 62/238.3 X |

Primary Examiner—Albert J. Makay
Assistant Examiner—Henry Bennett
Attorney, Agent, or Firm—Becker & Becker, Inc.

[57] ABSTRACT

A method and apparatus for recovering heat energy which is contained in the vapors of multi-stage evaporators utilized for thermal material-separation processes. According to the method, the vapors are supplied to at least one expulsion stage and to at least one vaporizing stage, whereby in the expulsion stage easily volatized or low boiling components of a multi-material mixture are vaporized, and in the vaporizing stage, at a pressure greater than the pressure in the expulsion stage, easily volatized components entering the vaporizing stage are vaporized; furthermore, the vaporous, easily volatized components at the higher pressure are supplied, along with the residue or remainder (the so-called residual mixture) of the multi-material mixture existing after the expulsion procedure, to an absorption stage; in addition, heating-steam or vapor is recovered by means of the heat resulting during the absorption stage.

The apparatus for carrying out the foregoing method includes an expeller, in which easily volatized components of a multi-material mixture are vaporizable by introduction of vapors withdrawn from a multi-stage evaporator, and which is connected, by way of a condenser for liquefication of the entering vaporous, easily volatized components, with an evaporator which is likewise heated by vapors; the vapor discharge of the evaporator is connected to an absorber. The heat-absorbing side of the expeller and the heat-emitting side of the absorber, have in common a supply line for the residual mixture resulting during the expulsion procedure, and also a return line for the multi-material mixture which is saturated after the absorption procedure. Furthermore, the heat-absorbing side of the absorber is equipped with a steam or vapor generator.

22 Claims, 2 Drawing Figures

METHOD OF AND APPARATUS FOR RECOVERING HEAT ENERGY CONTAINED IN VAPORS OF MULTI-STAGE EVAPORATORS INSTALLED FOR THERMAL MATERIAL-SEPARATING PROCESSES

The present invention relates to a method of recovering or reclaiming heat energy which is contained in the vapors of multi-stage vaporizers or evaporators utilized for thermal material-separation processes. The present invention also relates to an apparatus for carrying out such a method.

The vapors of the last partial stage of multi-stage evaporators are discharged as vapors or as condensate into the environment; if necessary the solution to be vaporized can be preheated by means of the vapor, which in so doing is partially condensed. Since the vapors, however, can transfer heat to the solution to be vaporized only until these vapors have nearly reached the vapor temperature, and since the latent heat content of the vapors is always greater than the heat quantity transferable during this procedure, a considerable part of the vapor heat must be discharged into the environment without being utilized.

In the event the temperature difference between the vapors withdrawn from the last partial stage, and the fresh steam or vapor for the first partial stage, is not too great, and in the event the composition and the state of the vapors permit, special vapor compressors can be installed for recovery or reclamation of the process steam. The operation of the vapor compressors under some circumstances, however, requires a higher consumption of energy than is saved by the recovery of the process steam or vapor.

It is an object of the present invention to generate heating-steam or vapor, by means of a suitable method and an apparatus for carrying out this method, while utilizing the heat energy contained in the vapors. In particular, this heating-steam or vapor is returned again to the multi-stage evaporator itself as process steam. The method and the apparatus are to be so embodied that the energy consumption for the preparation of the process steam is considerably reduced.

Figure 2:
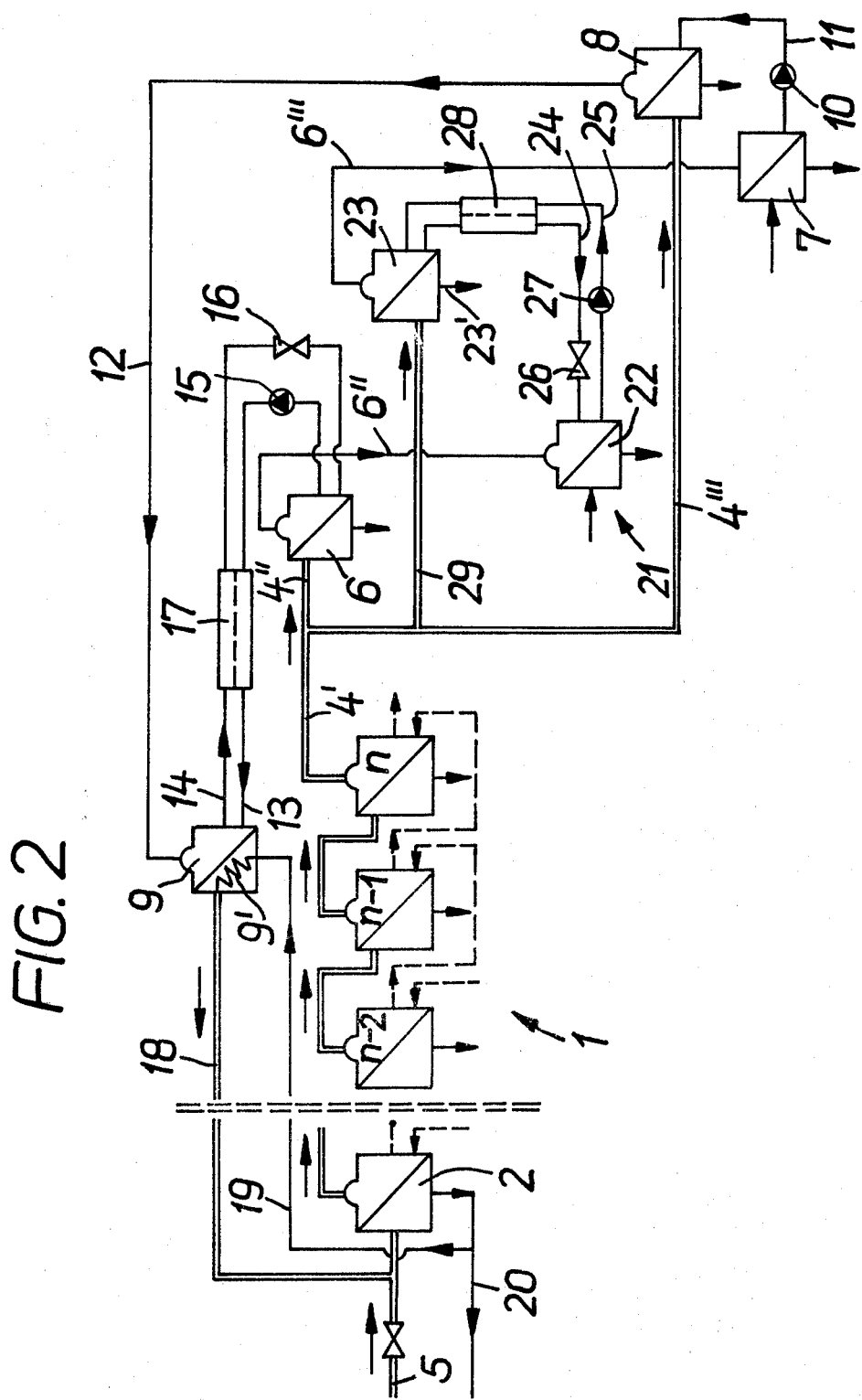

These and other objects and advantages of the present invention will appear more clearly from the following specification in connection with the accompanying drawings, in which:

FIG. 1 is a schematic illustration of the structural arrangement of the novel proposed apparatus without additional or auxiliary heat transformation means, whereby the apparatus cooperates with a three-stage evaporator or vaporizer; and FIG. 2 is a schematic illustration of one embodiment of the novel proposed apparatus with additional or auxiliary heat transformation means, whereby the apparatus cooperates with an n-stage evaporator.

The method of the present invention is characterized primarily in that the vapors are fed to at least one expulsion stage and to at least one vaporizng stage, whereby in the expulsion stage easily volatized or low boiling components of a multi-material mixture are vaporized, and in the vaporizer stage, at a pressure greater than the pressure in the expulsion stage, easily volatized components entering the vaporizing stage are vaporized; furthermore, the vaporous easily volatized components at the higher pressure are supplied, along with the residue or remainder (the so-called residual mixture) to the multi-material mixture existing after the expulsion procedure, to an absorption stage; in adittion, heating-steam or vapor is recovered by means of the heat resulting during the absorption stage. The concept for resolving the object of the present invention accordingly comprises utilization of the vapors of the multi-stage evaporator for operation of a heat transformer the working medium of which comprises a multi-material mixture with easily volatized or low-boiling components. This working medium on the one hand is divided into a residual mixture with a low concentration of easily vaporized components, and on the other hand is divided, in several method steps, into vaporous, easily vaporized components from which, in an absorption stage, heat is recovered for generating heating-steam or vapor. This heating-steam can be supplied as process steam to the multi-stage evaporator, especially to the first partial stage of the multi-stage evaporator.

An ammonia-water mixture is advantageously used as a suitable multi-material mixture having easily volatized components. Depending upon the need and application, other multi-material mixtures can, of course, also be used.

Expediently, the absorption process is controlled in such a manner that the multi-material mixture which is returned to the expulsion stage again has the composition originally provided. With a preferred embodiment of the method, the vaporous, easily volatized components departing from the expulsion stage are liquefied before their entry into the vaporizing stage, to which they are supplied at the higher pressure in condensate form. Expediently, the residual mixture, prior to entry into the absorption stage, is heated by means of the saturated multi-material mixture departing from the absorption stage.

In case the vapor temperature is insufficient to generate heating-steam or vapor of a particular temperature, then the method can be further embodied in such a way that the vaporous, easily volatized components of the multi-material mixture are supplied to one or more absorption stages prior to entry into the vaporizing stage; an absorption process connected with heat release, and an expulsion process, respectively take place in these absorption stages. A dividing of the multi-material mixture into easily volatized components and a residual mixture is again effected in the expulsion process. In other words, the vaporous, easily volatized components, prior to entry into the vaporizing stage, are supplied to at least one further absorption stage, in which a multi-material mixture, which is again saturated in an auxiliary absorption stage, is divided in an auxiliary expulsion stage into vaporous, easily volatized components and a residual mixture, and is returned from the auxiliary expulsion stage, after heat exchange with the colder saturated multi-material mixture, to the auxiliary absorption stage.

The liquefying processes, which precede the generation of the heating-steam, expediently occur at environmental or ambient temperature. Not only the condensation stage, but also all of the suitably existing auxiliary absorption stages operate accordingly at the indicated temperature.

The method can be further embodied particularly thereby that one or more of the following additional features are included therewith. The heating-steam may be recovered from at least a partial flow of the heating-steam condensate, which leaves the first partial stage of the multi-stage evaporator and is introduced into the absorption stage. The vapors may be fed partially to all expulsion stages and partially to the vaporizing stage. The vaporizing stage and all of the expulsion stages may be heated merely by means of the vapors of the last partial stage of the multi-stage evaporator. The vapors of different partial stages of the multi-stage evaporator may be supplied to different expulsion stages and vaporizing stages. The vapors which are withdrawn from one of the rear partial stages may be supplied partially to a subsequent partial stage and partially to one of the two method stages (expulsion stage, vaporizing stage) which are heated by means of vapor, and the vapors from the subsequent partial stage may be supplied to the other of the two method stages. The vapor condensate which leaves the method stages (expulsion stage, vaporizing stage) operating at a higher temperature level and heated by means of vapor, expands, e.g. by pressure drop, and the resulting steam or vapor is fed to the corresponding method stages (expulsion stages or vaporizing stages), which operate at a lower temperature level. In particular, it is also possible, in conformity with the temperature achieved, not to add the heating-steam or vapor to the fresh steam or vapor for the first partial stage, but rather to the vapors of one of the front partial stages of the multi-stage evaporator.

The apparatus which is suitable for carrying out the method, and which cooperates with a multi-stage evaporator, includes as essential components an expeller for partial evaporization of the easily volatized components of the multi-material mixture introduced therein, a condenser for liquefying the vaporous, easily volatized components of the multi-material mixture withdrawn from the expeller, a vaporizer, and an absorber which is additionally connected with the expeller by means of a pair of conduits.

The less concentrated residual mixture originating from the expeller is, at higher pressure, in a position to absorb the likewise introduced vaporous, easily volatized components until the original concentration of the multi-material mixture is again obtained. With this absorption process heat is released, the temperature of which, in the stationary operating condition, is clearly above the vapor temperature. The absorber is expediently equipped with a heat exchanger unit, with the aid of which heating-vapor or steam can be generated. The steam or vapor generator equipped with the heat exchanger unit can in particular be connected to the fresh steam or vapor conduit in the first partial stage of the multi-stage evaporator, or can also be connected to a vapor conduit of one of the subsequent partial stages. The heating-vapor can be generated particularly from the condensate which is removed from the first partial stage of the multi-stage evaporator.

The novel proposed apparatus can particularly be embodied further thereby to have additional features also described in detail in the following description. In the event the temperature of the vapors withdrawn from the multi-stage evaporator is not sufficient to generate heating-steam of a predetermined prescribed temperature, the apparatus can be equipped with one or more auxiliary heat transformers. These auxiliary heat transformers respectively comprise an auxiliary absorber, an auxiliary expeller, and supply and return lines which connect these two parts. In this connection, the supply line is equipped with a pump for raising the pressure of the residual mixture introduced into the absorber, while the return line has a throttle unit for reducing the pressure of the again saturated multi-material mixture to the pressure level of the auxiliary absorber.

For the purpose of a further temperature increase, the novel proposed apparatus can also be equipped with several auxiliary heat transformers which are sequentially connected in a cascadelike manner. In this connection, the heat, for heating, generated in an absorber of an auxiliary heat transformer is supplied to the subsequently connected expellers and evaporators of the next auxiliary heat transformer or transformers. The heat generated in one or more of these subsequent auxiliary heat transformers can be supplied to the multi-stage evaporator as process heat or, if necessary, can be supplied to a further auxiliary heat transformer, in the just described manner, as heat for heating.

In a particularly preferred embodiment of the novel proposed apparatus, all of the expellers, i.e., as the case may be, also the auxiliary expellers, and the evaporator, are connected by a conduit system with the vapor outlet or discharge of one and the same partial stage of the multi-stage evaporator, particularly with the last partial stage. To improve the heat yield, the apparatus, to the extent that not at least one of the auxiliary heat transformers is provided, can be equipped with a further heat exchanger in which the hot vaporous, easily volatized components leaving the expeller heat the condensate entering the evaporator nearly to the boiling or vaporizing temperature.

Referring now to the drawings in detail, the schematically illustrated three-stage vaporizer or evaporator 1 comprises sequentially connected partial stages 2, 3, and 4. The fresh steam or vapor conduit entering the first partial stage 2 is represented by the reference numeral 5; the vapor lines or conduits associated with the partial stages and at least partially joining these with each other are designated by the reference numerals 2', 3', and 4'.

The novel proposed apparatus comprises as essential components a driving-out means or expeller 6, a condenser 7, a vaporizer or evaporator 8, and an absorber 9. The expeller 6 and the evaporator 8 are heated by vapors withdrawn through the vapor conduit 4' by way of the conduit segments 4" and 4'" respectively in the illustrated embodiment. The outlets located on the heat-emitting side of the parts 6 and 8 are schematically designated by reference numerals 6' and 8'. The expeller 6 and the condenser 7 are connected with each other by way of a vapor line 6". The condenser 7, on the heat-emitting side, is connected with the heat-absorbing side of the evaporator 8 by way of a condensate line 11 which is equipped with a pump 10. This evaporator 8 is connected to the heat-emitting side of the absorber 9 by way of a vapor line 12.

The absorber 9, on the heat-emitting side, is furthermore provided with a supply line 13 and a return line 14, both of which are connected to the expeller 6 on the heat-emitting side. The lines 13 and 14 are equipped with a pump 15 and with a throttle unit 16 respectively, and are passed through a heat exchanger 17 externally of the pump 15 and the throttle unit 16.

The absorber 9, on the heat-absorbing side, which has a vapor generator 9' in the form of a suitable heat exchanger unit, is equipped with a heating-vapor or steam conduit 18, which empties into the fresh vapor conduit 5, and with a connecting line 19. The connecting line 19 in turn is connected to the heating-vapor or steam condensate conduit 20 of the partial stage 2 of the multi-stage evaporator 1.

The multi-stage evaporator 1 is heated in the first partial stage 2 with fresh steam or vapor at a temperature of, for example, 100° C.; the vapors depart the partial stage 4 by way of the vapor conduit 4' at a temperature of, for example, 70° C. A portion of the vapors is supplied through the conduit 4'' to the expeller 6, and through the conduit 4''' to the evaporator 8, whereby the vapors condense and give off heat. In the expeller 6, which contains an ammonia-water mixture with approximately 52% ammonia at a pressure of approximately 9 bar, nearly pure ammonia is evaporated by the heat of condensation of the vapors. This ammonia passes through the vapor line 6'' into the condenser 7, the pressure level of which corresponds approximately to that of the expeller 6.

The ammonia liquified in the condenser 7 at 20° C. is conveyed by the pump 10 through the condensate line 11 into the evaporator 8, in which a pressure of approximately 30 bar prevails. The ammonia, which at this pressure has a vaporizatiom temperature of 65° C., is evaporated by absorption of the heat of condensation of the vapors and is introduced into the absorber 9 by way of the vapor line 12. Here the vaporous ammonia is absorbed by the less concentrated residual mixture, which has a 47% ammonia content; this residual mixture passes into the absorber 9 from the expeller 6 by way of the supply line 13. A moist vapor mixture results during the absorption process and has a temperature of approximately 120° C.; the mixture is liquefied at approximately 108° C. by means of heat extraction. The heat to be dissipated is utilized for the purpose of producing heating-vapor or steam at a temperature of 100° C. by means of the steam or vapor generator 9' expediently integrated in the absorber 9. This heating-steam or vapor, by means of the heating-steam or vapor conduit 18, is mixed with the fresh steam or vapor supplied by way of the fresh steam or vapor conduit 5, and the resulting mixture is supplied to the first partial stage 2 of the multi-stage evaporator 1.

The ammonia-water mixture concentrated by the absorption process leaves the absorber 9 through the return line 14 in a saturated state and, after giving off heat to the less concentrated residual mixture in the heat exchanger 17, is throttled by the throttle unit 16 to the lower pressure level of the expeller 6 and is returned thereto.

Approximately 0.43 kg heating-vapor or steam at a temperature of 100° C. can be generated from one kg vapor at a temperature of 70° C. with the described apparatus, whereby simultaneously the cooling capacity necessary for condensing the vapors can be reduced by approximately 42%. The specific steam or vapor consumption of the three-stage evaporator equipped with the novel apparatus is approximately 35% lower than the specific steam or vapor consumption of a normal three-stage evaporator.

In the event the temperature difference between the temperature of the fresh steam or vapor and the temperature of the vapors from the last partial stage of the multi-stage evaporator is so great that it canot be bridged with the just described embodiment, then, as shown in FIG. 2, the novel proposed apparatus can be equipped with an auxiliary or additional heat transformation means (heat transformer) 21. This heat transformer 21 has as essential components an auxiliary absorber 22 and an auxiliary expeller 23, which are connected with each other on the heat-emitting side or on the heat-absorbing side by a pair of conduits with a supply or feed line 24 and a return conduit or line 25. The lines 24 and 25 are equipped in the same manner as the conduits 14 and 13 with a throttle unit 26 and a pump 27, and are passed through a heat exchanger 28.

The auxiliary absorber 22, which is cooled, for example, at 20° C., is connected with the expeller 6 by the vapor line 6'', and the auxiliary expeller 23 is connected with the condenser 7 by the vapor line 6'''. The auxiliary expeller 23 is connected with the vapor conduit 4' of the last partial stage n of an n-stage evaporator by way of an auxiliary conduit 29. Thus, the auxiliary expeller 23, just like the expeller 6 and the evaporator 8, which is connected after the condenser 7, is heated with the vapors of the last partial stage n. The vapor discharge from the auxiliary expeller 23 is designated with the reference numeral 23'.

First Example of Application

The fresh steam or vapor temperature is 120° C., the vapor temperature after the last partial stage of the three-stage evaporator illustrated in FIG. 1 is 70° C., and the cooling water or cooling air temperature is 15° C. Under these temperature conditions, the attainable temperature of the heat recovered in the absorber 9 is approximately 102° C., in which connection as a driving or operating temperature difference in the individual components of the novel apparatus a value of 5° C. is presumed. In the event a non-reduceable difference of 50° C. exists between the fresh steam or vapor temperature and the vapor temperature, and in the event the procedural requirements permit such a difference to exist, it is recommended to increase the fresh steam or vapor temperature to 135° C., and hence the vapor temperature to 85° C. In this case, the temperature in the absorber 9 is sufficiently high for generating heating-steam or vapor, having a temperature of 120° C., with the heat which is to be withdrawn at this location.

Second Example of Application

Assumption: The fresh steam or vapor temperature is 100° C., the vapor temperature of the last partial stage of the three-stage evaporator is 62° C., the vapor temperature of the next to the last partial stage is 77° C., and the cooling medium temperature is 15° C. The process requirements for the evaporator process cannot be changed. Under the already mentioned conditions, that the driving or operating temperature difference respectively amounts to 5° C., usable heat having a temperature of approximately 85° C. can be generated with the vapors of the last partial stage. In order to obtain heating-steam or vapor having a temperature of 100° C., a portion of the vapors at a temperature of 77° C. is supplied to the last partial stage, and a further portion of these vapors is supplied either to the expeller 6 or to the evaporator 8.

Either the evaporator 8 or the expeller 6 is heated with the vapors leaving the last partial stage, so that these two components operate at different temperature levels. The choice whether the expeller 6 or the evaporator 8 is to operate at the higher temperature level can be influenced by the selection of the multi-material mixture.

Heating-steam or vapor with a temperature of 100° C. can be generated in the absorber 9 at the indicated temperature conditions. This heating-steam or vapor can be utilized directly for heating the first partial stage of the three-stage evaporator.

Third Example of Application

Assumption: The fresh steam or vapor temperature is 130° C., the vapor temperature of the last partial stage of the multi-stage evaporator is 65° C., and the cooling medium temperature is 15° C. The process requirements for the evaporator process cannot be changed. The driving or operating temperature difference in the individual components of the apparatus is 5° C.

In order to handle an increase of the temperature from 65° C. to 130° C., the novel proposed apparatus, in accordance with the embodiment illustrated in FIG. 2, must be equipped with an additional or auxiliary transformer 21.

The vaporous, easily volatized components leaving the expeller 6 are supplied to an auxiliary absorber 22 through the line 6″, and are absorbed in the absorber 22 at environmental temperature by an unsaturated multi-material mixture. The mixture which is saturated after the absorption process passes by way of the pump 27, and after heat absorption in the heat exchanger 28, to an auxiliary expeller 23, in which the mixture is subdivided by heat supply and by means of the auxiliary conduit 29 into a residual mixture and vaporous, easily volatized components. After heat is given off to the heat exchanger 28 and after throttling by means of the throttling unit 26, the residual mixture returns to the auxiliary absorber 22. The easily volatized components are introduced into the absorber 9 in an already described manner by way of the condenser 7 and the evaporator 8. The heating-steam or vapor at a temperature of approximately 132° C. can be generated in the absorber 9 by means of the integrated steam generator 9′. The pressure in the absorber 9 and in the evaporator 8 is approximately 27 bar, in the condenser 7 and in the auxiliary expeller 23 is approximately 9 bar, and is approximately 3.3 bar in the expeller 6 and in the auxiliary absorber 22, which is cooled to 20° C.

In the event still greater differences between the waste heat and usable heat temperatures are to be equalized, the already previously mentioned proposals can be additionally utilized. Furthermore, it is possible to sequentially connect several of the auxiliary heat transformers illustrated in FIG. 2.

With the embodiment of the inventive teaching under consideration, approximately 0.21 kg heating-vapor or steam at a temperature of 130° C. (corresponding to 2.7 bar) can be generated from 1 kg vapors at a temperature of 65° C.

The advantage attained with the present invention consists particularly in that the heat recovered by means of the novel method and by means of the novel apparatus exists as heating-steam or vapor, and can be utilized during the vaporization process itself. This has as a consequence that the cost of the primary energy for the vaporization process, with regard to the quantity of evaporated solvent, is considerably reduced compared with heretofore known multi-stage evaporators having the same number of partial stages.

Additionally advantageous is that no special vapor condenser is required any more, and that, as a result of the better utilization of the heat content of the vapors, the requirement for cooling medium, and the thermal environmental loading, are reduced.

In summary, the present inventive apparatus for carrying out the method of recovering heat energy, contained in the vapors of multi-stage evaporators utilized for thermal material-separation processes, is characterized primarily in that an expeller 6, in which easily volatized components of a multi-material mixture are vaporizable by introduction of vapors withdrawn from a multi-stage evaporator 1, is connected, by way of a condenser 7 for liquification of the introduced vaporous, easily volatized components, with an evaporator 8 which is likewise heated by vapors; the vapor discharge of the evaporator 8 is connected to an absorber 9. the heat-absorbing side of the expeller 6, and the heat-emitting side of the absorber 9, have in common a supply line 13 for the residual mixture resulting during the expulsion procedure, and also a return line 14 for the multi-material mixture which is saturated after the absorption procedure. Furthermore, the heat-absorbing side of the absorber 9 is equipped with a steam or vapor generator 9′.

The connecting line 11 between the condenser 7 and the evaporator 8, and the supply line 13, are respectively equipped with a pump (10 and 15).

A throttle unit 16 is provided in the return line 14.

At least one auxiliary heat transformer 21 is installed in the vapor line 6″ between the expeller 6 and the condenser 7. The auxiliary heat transformer 21 comprises an auxiliary absorber 22, an auxiliary expeller 23, and a supply line 24 and a return line 25 interconnecting the parts 22, 23, whereby the supply line 24 is equipped with a throttle unit 26, and the return line 25 is equipped with a pump 27. Each pair of conduits 13, 14 and 24, 25, which comprise a supply line and a return line and connect an absorber 9, 22 with an expeller 6, 23, is passed through a heat exchanger 17 or 28.

All of the expellers 6, 23, and the evaporator 8, are connected by way of a conduit system with the vapor outlet or discharge of one and the same partial stage of the multi-stage evaporator 1. The conduit system 4′, 4″, 4‴; 29 is connected with the last partial stage 4 or n of the multi-stage evaporator 1.

The steam or vapor generator (absorber 9) on the one hand is connected to the fresh steam or vapor conduit 5, and on the other hand is connected to the heating-vapor or steam condensate conduit 20 of the first partial stage 2 of the multi-stage evaporator 1.

The present invention is, of course, in no way restricted to the specific disclosure of the specification and drawings, but also encompasses any modifications within the scope of the appended claims.

What I claim is:

1. A method of recovering heat energy which is contained in the vapors of multi-stage evaporators utilized for thermal material-separating processes with an isothermic absorption and including a heat transformer, said method comprising the steps of:

supplying said vapors to at least one expulsion stage and to at least one vaporizing stage of the heat transformer;

vaporizing easily volatized components of a multi-material mixture at a first pressure in said expulsion stage, resulting in a residue or residual mixture of said multi-material mixture;

vaporizing the easily volatized components entering said vaporizing stage in the latter at a second pressure, said second pressure being greater than said first pressure;

supplying heating-steam as process steam to said multi-stage evaporator;

supplying the vaporous, easily volatized components, which are at said higher second pressure, along with said residual mixture resulting from said expulsion stage, to at least one absorption stage of the heat transformer, resulting in the production of heat; and recovering heating-steam by means of said heat producing during said absorption stage.

2. A method according to claim 1, which includes the step of carrying out said absorption stage in such a way that multi-material mixture is returned to said expulsion stage at its originally provided composition.

3. A method according to claim 2, which includes the steps of liquefying said easily volatized components departing said expulsion stage prior to their entry into said vaporizing stage, and supplying these components to said vaporizing stage at said higher second pressure in condensate form.

4. A method according to claim 3, which includes the step of heating said residual mixture, prior to its entry into said absorption stage, by the saturated multi-material mixture departing said absorption stage.

5. A method according to claim 4, which includes the steps of supplying said vaporous, easily volatized components, prior to entry into said vaporizing stage, to at least one further absorption stage; saturating a multi-material mixture in an auxiliary absorption stage; dividing said saturated multi-material mixture in said further absorption stage, in an auxiliary expulsion stage, into vaporous, easily volatized components and into a residual mixture; heat exchanging the thus treated multi-material mixture with the colder saturated multi-material mixture; and subsequently returning said multi-material mixture to said auxiliary absorption stage.

6. A method according to claim 5, which includes the step of carrying out said liquefying of said vaporous, easily volatized components at ambient temperature.

7. A method according to claim 6, which includes the step of providing an ammonia-water mixture as said multi-material mixture.

8. A method according to claim 7, which includes the step of supplying said heating-steam as process steam to the first partial stage of said multi-stage evaporator.

9. A method according to claim 8, which includes the steps of withdrawing heating-steam condensate from the first partial stage of said multi-stage evaporator, introducing said condensate into said absorption stage, and recovering said heating-steam from at least a partial flow of said heating-steam condensate.

10. A method according to claim 9, which includes the steps of partially supplying said vapors to all expulsion stages, and partially supplying said vapors to said vaporizing stage.

11. A method according to claim 10, which includes the step of heating said vaporizing stage and all of said expulsion stages merely by means of the vapors of the last partial stage of said multi-stage evaporator.

12. A method according to claim 10, which includes the step of supplying vapors of different partial stages of said multi-stage evaporator to different expulsion stages and vaporizing stages.

13. A method according to claim 12, which includes the steps of withdrawing vapors from one of the later partial stage of said multi-stage evaporator, partially supplying said withdrawn vapors to a subsequent partial stage and to one of said expulsion stage and said vaporizing stage, withdrawing the vapors from the subsequent partial stage of said multi-stage evaporator, and supplying said subsequently withdrawn vapors to the other of said expulsion stage and said vaporizing stage.

14. A method according to claim 13, which includes the steps of expanding the vapor condensate which leaves said expulsion stage and said vaporizing stage, which operate at a higher temperature level and are heated by means of said vapor, to produce vapor; and supplying said thus produced vapor to the corresponding expulsion and vaporizing stages, which operate at a lower temperature level.

15. An apparatus recovering heat energy which is contained in the vapors of a multi-stage evaporator utilized for a thermal material-separating process with an isothermic absorption and including at least one absorption stage of a heat transformer, said apparatus comprising:

an expeller, in which easily volatized components of a multi-material mixture are vaporizable by introduction of vapors withdrawn from said multi-stage evaporator;

a condenser connected to and after said expeller for liquefication of vaporous, easily volatized components introduced from said expeller;

an evaporator which is connected to and after said condenser, and is also heated by said vapors;

an absorber connected to the vapor discharge of said evaporator;

a supply line, connecting the heat-absorbing side of said expeller with the heat-emitting side of said absorber, for residual mixture resulting during expulsion;

a return line, connecting the heat-emitting side of said absorber with the heat-absorbing side of said expeller, for multi-material mixture saturated during absorption; and a steam generator associated with the heat-absorbing side of said absorber.

16. An apparatus according to claim 15, which includes a connecting line for effecting connection of said condenser and said evaporator, said connecting line being provided with a first pump, and said supply line being provided with a second pump.

17. An apparatus according to claim 16, in which said return line is provided with a throttle unit.

18. An apparatus according to claim 17, which includes a vapor line for effecting connection of said expeller and said condenser, at least one auxiliary heat transformer being installed in said vapor line, said auxiliary heat transformer comprising an auxiliary absorber, an auxiliary expeller, and a supply line and a return line interconnecting said auxiliary absorber and said auxiliary expeller, said supply line being equipped with a throttle unit, and said return line being equipped with a pump.

19. An apparatus according to claim 18, in which each pair of supply lines and return lines is passed through a heat exchanger.

20. An apparatus according to claim 18, in which all of said expellers, and said evaporator, are connected with the vapor outlet of one and the same partial stage of said multi-stage evaporator.

21. An apparatus according to claim 20, in which all of said expellers, and said evaporator, are connected with the last partial stage, of said multi-stage evaporator.

22. An apparatus according to claim 21, which includes a fresh steam conduit connected to the first partial stage of said multi-stage evaporator and a heating-steam condensate conduit connected to the first partial stage of said multi-stage evaporator, and in which said steam generator of said absorber is connected to said fresh steam conduit and to said heating-steam condensate conduit.

* * * * *